No. 799,525. PATENTED SEPT. 12, 1905.
W. L. BLISS.
TRAIN LIGHTING SYSTEM.
APPLICATION FILED MAR. 15, 1905.
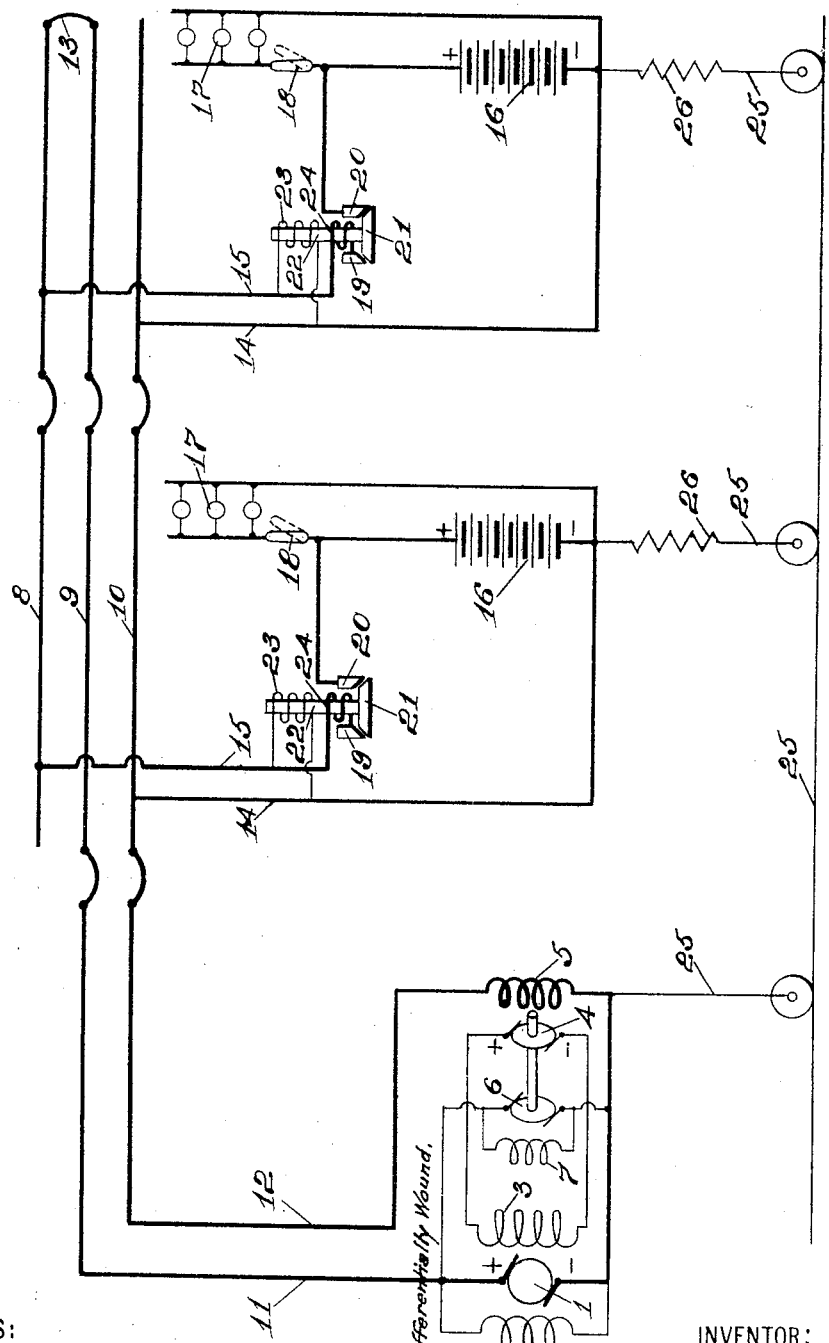
WITNESSES:
Herbert J. Smith
J. W. Robertson
INVENTOR:
William L. Bliss
BY
Edwin B. H. Tower, Jr.
ATTORNEY.

UNITED STATES PATENT OFFICE.

WILLIAM L. BLISS, OF BROOKLYN, NEW YORK, ASSIGNOR TO BLISS ELECTRIC CAR LIGHTING COMPANY, OF MILWAUKEE, WISCONSIN, A CORPORATION OF WISCONSIN.

TRAIN-LIGHTING SYSTEM.

No. 799,525.      Specification of Letters Patent.      Patented Sept. 12, 1905.

Application filed March 15, 1905. Serial No. 250,251.

*To all whom it may concern:*

Be it known that I, WILLIAM L. BLISS, a citizen of the United States, residing at Brooklyn, in the county of Kings and State of New York, have invented new and useful Improvements in Train-Lighting Systems, of which the following is a full, clear, concise, and exact description, reference being had to the accompanying drawing, forming a part of this specification.

The present invention relates to improvements in lighting systems which are especially adapted to be employed for lighting cars or other units of transportation by electricity.

The particular form of system to which the present invention especially relates is adapted to be employed for lighting a train of cars. It is provided with a single generator which furnishes the current for operating the entire system. It is also provided with storage batteries and translating devices arranged in circuit with said generator, a storage battery and translating device being carried upon each car or unit in the train. The generator is driven by an axle or other means, and it is automatically regulated to confine the output thereof within safe limits notwithstanding the wide variations in speed to which it is subjected.

The present application sets forth and claims a modification of an invention which is explained in an application filed June 15, 1904, Serial No. 212,593.

According to the present invention, the generator is regulated by an exciter, said exciter being controlled in operation by an electromagnetic winding which is arranged in circuit where it will be subjected to variations in current upon variations in the speed of the generator. The current which it is necessary for the generator to supply depends upon the number of cars or units in the train. If cars be added to the train, the current must be increased, and if cars be taken therefrom it must be decreased. If the electromagnetic winding which controls the operation of the exciter be subjected to variations in current under such circumstances, then it will cause the exciter to alter the regulation of the generator, thereby preventing said generator from making the output thereof commensurate with the demands for current. The purposes of the exciter will be attained if the electromagnet which controls the operation thereof be subjected to merely such variations in current as result from variations in the speed of the generator.

It is the object of the present invention to provide means which will prevent the exciter from altering the regulation of the generator upon variations in the output of said generator resulting from changes in the number of cars or units in the train.

The accompanying drawing illustrates a system which will be explained for the purpose of disclosing the present invention. It will of course be understood that the system illustrated in the drawing may be changed in many ways without departing from the invention and, furthermore, that said drawing illustrates merely sufficient features of the system to characterize the invention.

The generator is preferably arranged upon the tender of the locomotive; but it may be located elsewhere upon the train. The armature 1 of the generator is preferably geared to an axle, and in consequence it is driven at a variable speed. The field of the generator is preferbly provided with a shunt-winding 2 and a differential winding 3. The generator is regulated by an exciter, which is provided with an armature 4 and a field 5. The exciter-armature is connected to the differential field-winding 3, and the exciter-field 5 is arranged in circuit in series with the armature 1. The armature of the exciter is preferably driven by a motor which is provided with an armature 6 and a shunt-field 7, said motor being arranged to take its power from the generator. It will be understood that the exciter may be of various forms and that it may perform its purpose in different ways. Whenever the speed of the generator increases, the strength of the exciter field-winding 5 will be increased, thereby causing the exciter to increase the strength of the current in the differential field-winding 3, and thus decrease the strength of the field of the generator, and likewise whenever the speed of the generator decreases, the strength of the field-winding 5 will be decreased, thereby causing the exciter to decrease the strength of the current in the differential field-winding 3, and thus increase the strength of the field of the generator, due to the fact that the differential field-winding opposes the shunt field-winding, and the latter always predominates. The field strength of the generator will therefore be varied inversely as the speed of the armature varies, and in consequence the output of the generator will be confined within prearranged limits. The train is preferably provided with a train-line or main circuit, which extends through the cars or units thereof, said train-line preferably being composed of conductors 8, 9, and 10. The conductors 9 and 10 are preferably connected to the generator at the forward end of the train by conductors or supply-mains 11 and 12, and the conductors 8 and 9 are preferably connected to each other at the rear end of the train by a conductor or jumper 13.

The equipment which is installed upon each car will now be explained. The drawing illustrates equipments for two cars, and as both equipments are alike reference will be made to a single car in explaining the same. The car is provided with a local circuit composed of conductors 14 and 15, the conductor 14 being connected to the conductor 10 and the conductor 15 being connected to the conductor 8. The local circuit is arranged across the train-line in parallel with the other local circuits in the system. As the length of the circuit between the generator and each local circuit is the same, equal voltages will be impressed upon the local circuits. The car is also provided with a storage battery 16 and lamps and other translating devices 17, said storage battery and said lamps being arranged in said local circuit in parallel. The lamp-circuit is preferably controlled by a switch 18. The local circuit is preferably controlled by an automatic switch, which may be provided with stationary contacts 19 and 20 and a movable contact 21, said movable contact being adapted to engage said stationary contact to close the local circuit. The movable contact is preferably carried by a plunger 22, which is actuated by windings 23 and 24 to operate the switch. The winding 23 is preferably arranged across the local circuit between the switch-contacts and the train-line, and winding 24 is preferably arranged in the local circuit in series with the switch-contacts and the storage battery. The shunt-winding 23 will cause the switch to close whenever the voltage of the generator becomes equal to that of the storage battery. While the automatic switch remains closed the series winding 24 will be energized by current flowing through the local circuit, and so long as the generator sends current through the local circuit the series winding will assist the shunt-winding in keeping the movable contact firmly in engagement with the stationary contacts. Whenever the voltage of the generator falls below that of the storage battery, current will flow backward through the local circuit from said battery, and then the series winding will oppose the shunt-winding, as the polarity thereof will be reversed, thereby causing the switch to open.

When the generator is in operation, current will flow from the positive terminal thereof through supply-main 11, conductor 9, and jumper 13 to conductor 8, thence through the local circuits, and finally through conductor 10, supply-main 12, and exciter-field 5 to the negative terminal thereof. If the voltage of the generator be substantially equal to that of the storage battery, the current for operating the lamps will be furnished by the generator and storage battery together; but if it be greater than that of the storage battery the generator will furnish the entire current for operating the lamps and also current for charging the storage battery. It being assumed that the voltage of the generator is greater than that of the storage battery, the current will flow in the local circuit from local main 15 through the automatic switch, thence through switch 18 and lamps 17, and also through storage battery 16 to local main 14. Inasmuch as the current delivered to the storage battery will depend upon the voltage developed by the generator, it will vary whenever the speed of the generator varies. The current delivered to the storage battery will increase in almost direct proportion to the rise in voltage of the generator above the normal voltage of the storage battery, thereby causing the exciter-field 5 to be subjected to considerable variations in current upon slight variations in the speed of the generator. When the generator is inoperative, the storage battery will furnish the current for operating the lamps. When cars are added to the train, the output of the generator will increase to supply the increase in the demands for current, because new parallel circuits are placed across the train-line or main circuit, and when cars are taken from the train the output of the generator will decrease, because parallel circuits are removed from across the train-line. It may be assumed where two cars are in the train, as illustrated in the drawing, that the generator delivers a current of one hundred amperes, fifty amperes being distributed to each car. If a car be added to the train, the output of the generator will increase to one hundred and fifty amperes, and if a car be taken therefrom the output will decrease to fifty amperes.

It will be understood that the difference between the exciter which is shown in this application and the counter-electromotive-force device which is shown in my application filed June 15, 1904, Serial No. 212,593, is that the exciter furnishes current for energizing a winding upon the field of the generator, while the counter-electromotive-force device sends forth no current, but merely creates a counter electromotive force to oppose the current which the generator sends through a winding upon the field thereof.

If the exciter field-winding 5, which controls the regulation of the generator, were subjected to variations in current when the number of cars in the train is changed, it would cause the regulation of the generator to be altered, thereby preventing said generator from varying the output thereof in accordance with variations in the demands for current. To prevent such result, a shunt-circuit 25 may be extended around the exciter field-winding 5 from the local circuit, thereby causing current to be diverted from said winding. The shunt-circuit of each car is preferably provided with a resistance 26 to prevent it from short-circuiting the exciter field-winding. The wheels of the cars and the tracks upon which said wheels bear, as well as the conducting-framework of the cars, may constitute parts of each shunt-circuit; but it will of course be understood that any form of conductor may be employed to form the shunt-circuits. If a car be added to the train, another shunt-circuit will be provided, thereby increasing the number of parallel shunt-circuits extending around the exciter field-winding 5, and in consequence the current diverted from said winding will be increased to such an extent as to prevent said winding from being subjected materially to the increase in the output of the generator, and if a car be taken from the train a shunt-circuit will be removed, thereby decreasing the number of parallel shunt-circuits around the exciter field-winding, and in consequence the current diverted from said winding will be decreased to such an extent as to prevent said winding from being subjected materially to the decrease in the output of the generator. The output of the generator may therefore vary whenever the number of cars in the train is changed without causing the exciter to alter the regulation of the generator.

It will be understood that many changes may be made in the system which has been set forth herein without in any way departing from the invention as defined by the claims of this application.

Having described my invention, what I claim as new, and desire to secure by Letters Patent, is—

1. In a train-lighting system, in combination, a generator driven at a variable speed, a storage battery and translating devices carried upon each of a plurality of units of the train and arranged in circuit with said generator, an exciter regulating said generator to confine the output thereof within prearranged limits, and electromagnetic winding controlling the operation of said exciter, and means for preventing said winding from altering the regulation of said generator upon variations in the output of said generator resulting from changes in the number of units in the train.

2. In a train-lighting system, in combination, a generator driven at a variable speed, a storage battery and translating devices carried upon each of a plurality of units of the train and arranged in circuit with said generator in parallel, an exciter regulating said generator to confine the output thereof within prearranged limits, an electromagnetic winding controlling the operation of said exciter to confine the output of said generator within prearranged limits, said winding being arranged in circuit to be responsive to variations in current, and means for preventing said winding from altering the regulation of said generator upon variations in the output of said generator resulting from changes in the number of units in the train.

3. In a train-lighting system, in combination, a generator driven at a variable speed, a main circuit extending from said generator, a local circuit arranged upon each of a plurality of units of the train, translating devices arranged in each local circuit, an exciter regulating said generator to confine the output thereof within prearranged limits, an electromagnetic winding arranged in said main circuit to respond to variations in current and controlling the operation of said exciter, and means for preventing said winding from altering the regulation of said generator upon variations in the output of said generator resulting from changes in the number of units in the train.

4. In a train-lighting system, in combination, a generator driven at a variable speed, a main circuit extending from said generator, a local circuit arranged upon each of a plurality of units of the train, a storage battery and translating devices arranged in each local circuit, an exciter regulating said generator to confine the output thereof within prearranged limits, a shunt-motor for driving said exciter, an electromagnetic winding controlling the operation of said exciter and arranged in said main circuit to be responsive to variations in current, and means for preventing said winding from causing said exciter to alter the regulation of said generator upon variations in the output of said generator resulting from changes in the number of units in the train.

5. In a train-lighting system, in combination, a generator driven at a variable speed and provided with a shunt field-winding and a differential field-winding, a storage battery and translating devices carried upon each of a plurality of units of the train and arranged in circuit with said generator, an exciter regulating said generator to confine the output thereof within prearranged limits, said exciter being arranged in circuit to vary the strength of the current in said differential field-winding, an electromagnetic winding controlling the operation of said exciter and arranged in circuit with said generator to be responsive to variations in current, and means for preventing said exciter from altering the regulation of said generator upon variations in the output of said generator resulting from changes in the number of units in the train.

6. In a train-lighting system, in combination, a generator driven at a variable speed and provided with a shunt field-winding and a differential field-winding, a main circuit extending from said generator and passing through a plurality of units of the train, a local circuit arranged upon each of said units and connected to said main circuit, a storage battery and translating devices arranged in each local circuit, an exciter regulating said generator to confine the output thereof within prearranged limits, the armature of said exciter being connected to said differential field-winding, an electromagnetic winding controlling the operation of said exciter and arranged in said main circuit in series, and means for preventing said exciter from altering the regulation of said generator upon variations in the output of said generator resulting from changes in the number of units in the train.

7. In a train-lighting system, in combination, a generator arranged upon the tender of the locomotive and driven at a variable speed, a main circuit extending from said generator and passing through a plurality of cars, a parallel local circuit arranged upon each of said cars, a storage battery and translating devices arranged in each local circuit, an exciter arranged upon said tender and regulating said generator to confine the output thereof within prearranged limits, an electromagnetic winding controlling the operation of said exciter and arranged in said main circuit in series, and means for preventing said exciter from altering the regulation of said generator upon variations in the output of said generator resulting from changes in the number of units in the train.

8. In a train-lighting system, in combination, a generator driven at a variable speed, a storage battery and translating devices carried upon each of a plurality of units of the train and arranged in circuit with said generator, an exciter regulating said generator to confine the output thereof within prearranged limits, an electromagnetic winding arranged in circuit to respond to variations in current and controlling the operation of said exciter, and a shunt-circuit extending from each unit and passing around said winding, whereby the output of said generator may vary upon changes in the number of units in the train without thereby causing said exciter to alter the regulation of said generator.

9. In a train-lighting system, in combination, a generator driven at a variable speed, a local circuit arranged upon each of a plurality of units of the train and connected to said generator, translating devices arranged in each local circuit, an exciter regulating said generator to confine the output thereof within prearranged limits, an electromagnetic winding arranged in circuit to respond to variations in current and controlling the operation of said exciter, and a shunt-circuit extending from each local circuit and passing around said winding, whereby the output of said generator may vary upon changes in the number of units in the train without thereby causing said exciter to alter the regulation of said generator.

10. In a train-lighting system, in combination, a generator driven at variable speed, a main circuit extending from said generator, a local circuit arranged upon each of a plurality of units of the train and connected to said main circuit, a storage battery and translating devices arranged in each local circuit, an exciter regulating said generator to confine the output thereof within prearranged limits, an electromagnetic winding arranged in said circuit in series and controlling the operation of said exciter, and a shunt-circuit extending from each local circuit and passing around said electromagnetic winding, each shunt-circuit being provided with a resistance.

11. In a train-lighting system, in combination, a generator driven at a variable speed, a main circuit extending from said generator, a train-line extending through a plurality of units of the train and connected to said main circuit, a local circuit arranged upon each unit and connected to said train-line, a storage battery and translating devices arranged in each local circuit, an exciter for regulating said generator to confine the output thereof within prearranged limits, an electromagnetic winding arranged in said main circuit between said generator and said local circuits, said winding being in series with said storage batteries and said translating devices, and a shunt-circuit extending from each local circuit to said generator and passing around said winding, each shunt-circuit being provided with a resistance.

12. In a train-lighting system, in combination, a generator arranged upon the tender of the locomotive, a local circuit arranged upon each of a plurality of cars and connected to said generator, a storage battery and translating devices arranged in each local circuit, an exciter regulating said generator to confine the output thereof within prearranged limits, an electromagnetic winding arranged in circuit to respond to variations in current and controlling the operation of said exciter, and a shunt-circuit extending from each local circuit to said generator and passing around said electromagnetic winding.

13. In a train-lighting system, in combination, a generator driven at a variable speed and provided with a shunt field-winding and a differential field-winding, a local circuit arranged upon each of a plurality of units of the train and connected to said generator, a storage battery and translating devices arranged in each local circuit, an exciter for regulating the strength of the current in said differential field-winding, an electromagnetic winding arranged in circuit to respond to variations in current and controlling the operation of said exciter, and a shunt-circuit extending from each local circuit and passing around said controlling electromagnetic winding.

14. In a train-lighting system, in combination, a generator driven at a variable speed and provided with a shunt field-winding and a differential field-winding, a main circuit extending from said generator, a local circuit arranged upon each of a plurality of units of the train and connected to said main circuit, a storage battery and translating devices arranged in each local circuit, an exciter regulating the strength of the current in said differential field-winding to confine the output of the generator within prearranged limits, a motor driving said exciter, an electromagnetic winding arranged in said main circuit in series and controlling the operation of said exciter, and a shunt-circuit extending from each local circuit and passing around said controlling electromagnetic winding.

15. In a train-lighting system, in combination, a generator driven at a variable speed, a main circuit extending therefrom, a train-line extending through a plurality of units of the train and connected to said main circuit, a local circuit arranged upon each of said units and connected to said train-line in parallel with the other local circuits, a storage battery and translating devices arranged in each local circuit, an exciter regulating said generator to confine the output thereof within prearranged limits, a motor driving said exciter, an electromagnetic winding controlling the operation of said exciter and arranged in said main circuit in series, and a shunt-circuit extending from each local circuit and passing around said controlling electromagnetic winding.

16. In a train-lighting system, in combination, a generator driven at a variable speed and provided with a shunt field-winding and a differential field-winding, a main circuit extending from said generator, a train-circuit passing through a plurality of units of the train, a local circuit arranged upon each unit and connected to said train-line in parallel with the other local circuits, an automatic switch controlling each local circuit, a storage battery and translating devices arranged in each local circuit in parallel, an exciter regulating the strength of the current in said differential field-winding to confine the output thereof within prearranged limits, a motor driving said exciter, an electromagnetic winding arranged in said main circuit in series and controlling the operation of said exciter, and a parallel shunt-circuit extending from each local circuit and passing around said controlling electromagnetic winding, each shunt-circuit being provided with a resistance, and arranged in parallel with the other shunt-circuits.

17. In a train-lighting system, in combination, a generator driven at a variable speed and arranged upon the tender of the locomotive, a local circuit arranged upon each of a plurality of cars, a storage battery and translating devices arranged in each local circuit, an exciter arranged upon said tender and regulating said generator to confine the output thereof within prearranged limits, an electromagnetic winding arranged in circuit to respond to variations in current and controlling the operation of said exciter, and a shunt-circuit extending from each local circuit and passing around said controlling electromagnetic winding, whereby the output of said generator may vary upon changes in the number of cars in the train without thereby causing said controlling electromagnetic winding to alter the regulation of said generator.

In witness whereof I have hereunto subscribed my name in the presence of two witnesses.

WILLIAM L. BLISS.

Witnesses:
GEORGE MUELLER,
J. N. ROBERTSON.